(12) United States Patent
Su et al.

(10) Patent No.: US 8,835,015 B2
(45) Date of Patent: *Sep. 16, 2014

(54) HIGH OXYGEN TRANSMISSION BIAXIALLY ORIENTED FILM WITH IMPROVED TENSILE PROPERTIES

(75) Inventors: Tien-Kuei Su, Somerset, NJ (US); Keunsuk P. Chang, North Kingstown, RI (US)

(73) Assignee: Toray Plastics (America), Inc., N. Kingstown, RI (US)

( * ) Notice: Subject to any disclaimer, the term of this patent is extended or adjusted under 35 U.S.C. 154(b) by 649 days.

This patent is subject to a terminal disclaimer.

(21) Appl. No.: 11/015,785

(22) Filed: Dec. 20, 2004

(65) Prior Publication Data

US 2005/0142372 A1 Jun. 30, 2005

Related U.S. Application Data

(63) Continuation-in-part of application No. 10/738,984, filed on Dec. 19, 2003, now Pat. No. 7,078,463.

(60) Provisional application No. 60/531,973, filed on Dec. 24, 2003.

(51) Int. Cl.
| | |
|---|---|
| *B32B 27/08* | (2006.01) |
| *C08L 47/00* | (2006.01) |
| *C08F 255/02* | (2006.01) |
| *B32B 27/32* | (2006.01) |
| *B32B 25/18* | (2006.01) |
| *B32B 25/08* | (2006.01) |

(52) U.S. Cl.
CPC .................. *B32B 25/18* (2013.01); *B32B 27/32* (2013.01); *B32B 25/08* (2013.01); *Y10S 428/91* (2013.01)
USPC ............ 428/515; 428/910; 525/236; 525/322

(58) Field of Classification Search
USPC .................... 428/516, 515, 910; 525/236, 322
See application file for complete search history.

(56) References Cited

U.S. PATENT DOCUMENTS

| | | | | |
|---|---|---|---|---|
| 3,627,852 | A | * | 12/1971 | Aishima et al. .................. 525/88 |
| 4,897,274 | A | * | 1/1990 | Candida et al. ............... 426/127 |
| 5,418,272 | A | * | 5/1995 | Kawabata et al. ............ 524/436 |
| 5,449,722 | A | * | 9/1995 | Nishida et al. .................. 525/98 |
| 5,616,420 | A | * | 4/1997 | Yamaoka et al. ............. 428/515 |
| 5,837,787 | A | * | 11/1998 | Harrington ................... 526/160 |
| 5,948,839 | A | | 9/1999 | Chatterjee |
| 6,231,939 | B1 | * | 5/2001 | Shaw et al. .................. 428/35.9 |
| 6,232,402 | B1 | | 5/2001 | DeMeuse |
| 6,242,525 | B1 | * | 6/2001 | Raetzsch et al. ............. 524/525 |
| 6,348,271 | B1 | * | 2/2002 | Nakata et al. ................ 428/500 |
| 6,395,071 | B1 | * | 5/2002 | Niijima et al. ...................... 96/6 |
| 6,410,136 | B1 | * | 6/2002 | DeMeuse ...................... 428/347 |
| 6,485,817 | B1 | | 11/2002 | DeMeuse |
| 6,514,625 | B1 | * | 2/2003 | DeMeuse ...................... 428/516 |
| 6,517,936 | B1 | * | 2/2003 | Ciocca et al. ................. 428/349 |
| 6,517,950 | B1 | * | 2/2003 | Patrick et al. ................. 428/516 |
| 7,078,463 | B2 | | 7/2006 | Su et al. |
| 7,083,838 | B2 | * | 8/2006 | Pettis .......................... 428/34.9 |
| 2002/0160135 | A1 | * | 10/2002 | Christopherson et al. ... 428/35.7 |
| 2003/0166776 | A1 | * | 9/2003 | Wright et al. ................... 525/88 |
| 2005/0142372 | A1 | | 6/2005 | Su et al. |

FOREIGN PATENT DOCUMENTS

WO 9933658 * 7/1999

OTHER PUBLICATIONS

Encyclopedia Britannica, Feb 13, 2010; http://www.britannica.com/EBchecked/topic/692466/ethylene-propylene-copolymer.*
http://www.polymerprocessing.com/polymers/EPR.html, (2000).*
http://www.parker.com/portal/site/PARKER/menuitem.7100150cebe5bbc2d6806710237ad1ca/?vgnextoid=f5c9b5bbec622110VgnVCM10000032a71dacRCRD&vgnextdiv=687519&vgnextcatid=2618364&vgnextcat=ETHYLENE%20PROPYLENE%2ORUBBER%20(EPM,%20EPR,%20EPDM)%20O-RINGS&vgnextfmt=default, (2007).*
Su, T. et al., U.S. Office Action mailed on Sep. 15, 2005, directed to U.S. Appl. No. 10/738,984; 9 pages.
International Search Report mailed on Jul. 2, 2004, directed to International Patent Application No. PCT/US2003/040777; 8 pages.

* cited by examiner

*Primary Examiner* — Kevin R Kruer
(74) *Attorney, Agent, or Firm* — Morrison & Foerster LLP

(57) ABSTRACT

A biaxially oriented multilayer film having (a) a polyolefinic core layer containing (i) a thermoplastic material containing an alpha-olefin/polypropylene-containing copolymer, the thermoplastic material being in an amount of about 10% to 70% by weight of the core layer and (ii) an isotactic polypropylene-containing copolymer in an amount of greater than 0% to about 50% by weight of the core layer and (b) a skin layer containing a styrene-butadiene copolymer or a cyclic olefin copolymer is disclosed.

19 Claims, No Drawings

HIGH OXYGEN TRANSMISSION BIAXIALLY ORIENTED FILM WITH IMPROVED TENSILE PROPERTIES

CROSS-REFERENCE TO RELATED APPLICATIONS

This application claims benefit from Provisional Application Ser. No. 60/531,973 filed Dec. 24, 2003, and U.S. application Ser. No. 10/738,984, filed Dec. 19, 2003, the entire disclosures of which are hereby incorporated herein by reference.

FIELD OF INVENTION

This invention relates to a multilayer packaging film comprising a polyolefin blended base layer and at least one outer layer. More specifically, the invention relates to a biaxially oriented film that has high oxygen transmission, good tensile modulus and excellent optical properties, i.e., low haze and high gloss.

BACKGROUND OF INVENTION

Conventional biaxially oriented polypropylene (BOPP) films are commonly laminated to monolayer breathable blown films of various types of polyethylenes, ethylene copolymers or ionomers. BOPP films are known to provide excellent transparency, thermal resistance, excellent gloss, and high tensile strength. The conventional BOPP film typically has not been modified and as such has high levels of crystallinity that reduce the transfer of gases such as oxygen and carbon dioxide through the film. Typically, BOPP film is supplied in a thickness between 0.4 mil to 0.7 mil. This film typically provides a barrier of 260 cc/100 in$^2$/day (0.4 mil) to 149 cc/100 in$^2$/day (0.7 mil). Obviously, it is necessary to reduce the thickness of the BOPP film in order to provide adequate oxygen transmission. This reduction in thickness can be undesirable, as the film generally becomes more susceptible to edge tearing as the film is decreased in gauge. This edge tearing can be counterproductive for the converter. In addition, the BOPP would preferably be treated on one surface to accept printing inks readily. This BOPP film is reverse printed on the treated surface and subsequently adhesively laminated to the monolayer blown film. Again, as film thickness is decreased, the film is generally more difficult to print by the converter in terms of maintaining print registration due to the thin film's lower tensile properties and a propensity to stretch more easily under tension. Typically, an antifog coating is applied to the monolayer film after lamination. This laminated film is then formed into a package to enclose product such as fruit, vegetables, or fresh cut salad that require breathability.

There are a variety of applications, such as food packaging, that require packaging film that have excellent tensile, optical properties and gas transmission properties. However, there are several problems with current packaging films.

U.S. Pat. No. 6,232,402 (DeMeuse '402) discloses biaxially oriented polypropylene film comprising a mixture of 75-92% by weight isotactic polypropylene, 5-15% by weight low density polyethylene, and 3-10% by weight of an olefin heteropolymer containing polypropylene and at least one other 2-4 carbon alpha olefin. The invention cited examples claiming oxygen transmission values in the range of between 206.0-285.6 cc/100 in$^2$/day. These oxygen transmission values are quite low as compared to the present invention. In addition, the presence of low density polyethylene and olefin heteropolymer in the formulation, decreases the thermal properties of the BOPP film that are necessary during sealing.

U.S. Pat. No. 6,410,136 (DeMeuse '136) discloses a biaxially oriented film comprised of a mixture of 10%-60% by weight of isotactic polypropylene, 10%-25% by weight of low density polyethylene and about 15%-80% by weight of an olefin heteropolymer containing polypropylene and at least one other alpha olefin of 2 to 4 carbon atoms. The invention cited examples claiming oxygen transmission values in the range of between 323.3-589.6 cc/100 in$^2$/day. These oxygen transmission values are in the range of the present invention, however the high levels of heteropolymer and low density polyethylene decreases the thermal properties of the film that are necessary during sealing.

U.S. Pat. No. 6,395,071 (Niijima) discloses a breathing film which contains a block copolymer composition comprising crystalline polypropylene and propylene alpha olefin random copolymer having 45-85% by weight of propylene unit-containing on the weight of copolymer. The film thickness is between 10 and 100 microns and having an anitbacterial agent coated thereon or included therein. The invention cited examples claiming oxygen transmission values in the range of between 781.3-800.8 cc/100 in$^2$/day. These oxygen transmission values are very good, however the tensile modulus values are in the range of from 122,000-126,000 psi, which is very low for the application.

U.S. Pat. No. 6,485,817 (Demeuse '817) discloses a transparent composite oriented film comprising a first layer and at least a second layer, said first layer consisting essentially of an ethylene/propylene copolymer including less than 10% by weight ethylene, said at least second skin layer being a high tensile modulus polypropylene. The invention examples indicate oxygen transmission values in the range of 215.2-363.7 cc/100 in$^2$/day. These oxygen transmission values are lower than the present invention.

U.S. Pat. No. 6,348,271 (Nakata) discloses a multilayer film having a thickness of 10-100 um, wherein the film comprises at least one layer obtained by processing and drawing a block copolymer composition in at least monoaxial direction, and the block copolymer composition comprises 93-30% by weight of a propylene polymer component and 7-70% by weight of a ethylene/propylene copolymer. This polymer is essentially a block copolymer where the ethylene/propylene copolymer content is tailored to balance the film transparency, tensile properties and oxygen transmission of the film. The example cited by this patent indicates oxygen transmission values in the range of 244-762 cc/100 in$^2$/day. However, as the oxygen transmission increases, the tensile properties are also reduced dramatically.

These prior art structures use either ethylene/propylene copolymers, polypropylene block copolymers including ethylene/propylene rubber, or three component blends with low density polyethylene. These methods of increasing oxygen transmission are successful; however, each type sacrifices some desired film attribute in order to improve the oxygen transmission.

U.S. patent application Ser. No. 10/738,984 (Moreau), which is incorporated herein by reference, discloses a high oxygen transmission film composition using a blend of propylene homopolymer, propylene—containing impact copolymer, and an alpha-olefin propylene—containing thermoplastic olefin. Skin layers are added to this primary layer to provide stiffness and gloss, and in the examples cited, the skin layers are isotactic propylene homopolymers.

In light of the deficiencies of the prior art, this invention provides several advantages, among others, not only to increase the oxygen transmission of the film, but also to maximize gloss, tensile strength, and thermal resistance while minimizing haze. This BOPP film with balanced properties performance satisfies the total film requirements where the prior art structures do not fully satisfy all of these criteria.

SUMMARY OF THE INVENTION

This invention provides a film with high levels of oxygen transmission that are desired for the packaging of fruits, vegetables, and fresh cut salad. This invention further maintains necessary properties of the film such as haze, gloss, temperature resistance, and tensile strength. Achieving these desired results could produce a package with extended product shelf life, excellent surface aesthetics, and durability.

Some of the embodiments include a biaxially oriented multilayer film comprising (a) a polyolefinic core layer comprising (i) a thermoplastic material comprising an alpha-olefin/polypropylene-containing copolymer, the thermoplastic material being in an amount of about 10% to 70% by weight of the core layer and (ii) an isotactic polypropylene-containing copolymer in an amount of greater than 0% to about 50% by weight of the core layer and (b) a skin layer comprising a styrene-butadiene copolymer or a cyclic olefin copolymer. Preferably, the polyolefinic core layer further comprises a homopolymer matrix copolymer having two distinct phases: a continuous homopolymer matrix phase and a dispersed phase of ethylene-propylene rubber particles. Preferably, the skin layer further comprises polystyrene. Preferably, the isotactic polypropylene-containing copolymer has an isotactic index in the range of form 90-98% and a melt flow index in the range of between 1 to 10 g/10 min. Preferably, the isotactic polypropylene-containing copolymer comprises a rubber having a rubber content between 5-30% by weight of the copolymer and an ethylene content of from 10% to 80% by weight of the rubber. Preferably, the alpha olefin/polypropylene-containing copolymer has a melt flow index in the range of between 1 to 10 g/10 min, the alpha olefin of the alpha olefin/polypropylene-containing copolymer is ethylene, and the ethylene content of the alpha olefin/polypropylene-containing copolymer is between 1-10% by weight of the alpha olefin/polypropylene-containing copolymer. Preferably, the alpha olefin/polypropylene-containing copolymer comprises a rubber having a rubber content between 30-80% by weight of the alpha olefin/polypropylene-containing copolymer and an ethylene content of 10%-80% by weight of the rubber. Preferably, the isotactic polypropylene-containing copolymer is a minirandom isotactic polypropylene polymer. Preferably, the cyclic olefin copolymer is transparent, amorphous, has a tensile modulus from 318-465 kspi and a glass transition temperature ($T_g$) ranging from 68-180° C.

Another embodiment is a biaxially oriented multilayer film comprising (a) a polyolefinic core layer and (b) a skin layer comprising a copolymer, wherein the biaxially oriented multilayer film has the following properties: (i) an oxygen transmission normalized to 60 gauge of at least 500 cc/100 in$^2$/day, (ii) a 45 degree angle gloss of at least 100, (iii) haze of less than 5%, and (iv) a tensile modulus of greater than 160,000 psi. Preferably, the oxygen transmission normalized to 60 gauge is at least 650 cc/100 in$^2$/day. Preferably, a 45 degree angle gloss is at least 110. Preferably, the haze is less than 4.5%. Preferably, the tensile modulus is at least 170,000 psi. Preferably, the polyolefinic core layer comprises a thermoplastic material wherein an ethylene propylene rubber is copolymerized into an ethylene/propylene copolymer network. Preferably, the polyolefinic core layer further comprises a minirandom isotactic polypropylene polymer. Preferably, the skin layer is surface treated and has nitrogen-containing function groups on 0.3% to 1.0% of a surface of the skin layer.

DETAILED DESCRIPTION OF THE INVENTION

For breathable blown films, it is desired that the finished film product has the following characteristics: 1) high oxygen transmission, 2) excellent surface gloss, 3) excellent tensile strength, 4) excellent thermal resistance and 5) minimal haze. The high oxygen transmission is desired such that the organic product can give off carbon dioxide and take in oxygen. If neither one of these processes take place, the organic produce could spoil. Thus, in order to increase the product shelf life, it is necessary to increase the oxygen transmission of the film. The surface gloss is an important attribute of this film as it is a selling point to the consumer. Such surface gloss that is provided by conventional BOPP films is attractive to the consumer and is differentiated on the market shelf. The tensile strength is desired during the printing and laminating processes as high tensions are used in these processes. Lack of appropriate tensile strength could cause the film to distort easily. The BOPP film would preferably have thermal resistance, as the converted laminated composite film could be heat sealed. It is necessary that the blown film behaves as a sealant and melts thoroughly to itself to provide tensile strength. However, the BOPP film would preferably not distort at these heat sealing temperatures. This distortion could result in unpleasing package aesthetics for the consumer of the packaged organic product. Finally, the haze of the composite lamination would preferably be low enough such that the consumer can view the packaged organic product. However, the blown film typically has a high level of haze, thus the BOPP film should have less haze than that of the blown film.

The packaging converters often require more options to achieve a high oxygen transmission lamination. Typically, a thin gauge BOPP film, typically 0.40 mil, is laminated to a blown polyethylene film. Since the BOPP film options available on the market have been limited, the converter could be forced to change the blown film type to match the end-user oxygen transmission requirements. As the oxygen transmission of the blown film becomes more demanding, more expensive and exotic resins have been used to achieve the desired oxygen transmission, resulting in increased cost and difficulties for the converter. Therefore, there is a need for a biaxially oriented polypropylene film with high oxygen transmission. This high oxygen transmission BOPP film would allow the converter more freedom to increase the oxygen transmission of the composite lamination and thus provides lower cost options to the converter.

However, in many respects, film formulations to achieve high oxygen transmission usually involve blends or compositions of propylene homopolymer with ethylene-propylene copolymers, terpolymers, thermoplastic polyolefins and similar materials which are low in crystallinity. These blends can range from using no propylene homopolymer (e.g. 100% ethylene copolymer) to certain percentages of propylene homopolymers. The concept is that the low crystallinity components provides the pathways for the gases to diffuse through. The blending with propylene homopolymer helps maintain stiffness and adequate tensile properties for converting the film effectively. Nevertheless, the use of these low crystallinity components tends to have a negative effect on the final film's tensile properties due to their non-crystalline, amorphous nature. One solution may be to encapsulate the high oxygen transmission blended core layer with propylene homopolymer skins to provide stiffness and gloss, but the tradeoff is usually a decrease in overall transmission rates as the homopolymer skin layers act as a gas barrier due to their higher crystallinity versus the blended core layer.

It is an embodiment of this invention to provide a solution to the high oxygen transmission BOPP film requirement that is desired by converters. It is also an embodiment of this invention to provide a solution in providing a film with high oxygen transmission with improved tensile properties for converting and customer appeal.

The inventive film was specifically designed with one of the attributes of the film being high oxygen transmission. The necessity for this high oxygen transmission requirement is that when fruits and vegetables are harvested, they consume oxygen and give off carbon dioxide. Thus, it is also necessary for carbon dioxide to be transmitted through the package. Typically, carbon dioxide transmission through a film or lamination is four times greater than the oxygen transmission. Thus, if the oxygen transmission is increased the carbon dioxide transmission is also increased. In addition to the aforementioned increase in gas transmission through the film, it is desirable to balance other important film attributes. Among these desirable attributes are a high level of gloss, a low level of haze, good mechanical strength, and thermal stability.

The inventive film is constructed of multiple layers having at least 2 layers, a core layer and a skin layer, or preferably, 3 layers, a core layer and 2 skin layers, one on each side of the core layer. In the latter case, the 2 skin layers may be comprised of the same materials or they may be comprised of dissimilar materials. While the core layer is the bulk of the film structure, all of the film layers contribute to the oxygen transmission of the film. Therefore, the composition and layer thickness distribution of the coextruded layers would preferably be considered carefully so as to maximize oxygen transmission as well as the other aforementioned properties.

The core layer of the inventive film could be a multiple polymer component blend.

The first component of the blend is an ethylene/propylene copolymer matrix thermoplastic olefin (TPO). Specifically, the matrix resin of the TPO is an ethylene/propylene polymer, where ethylene propylene rubber is copolymerized into the ethylene/propylene copolymer network. Suitable commercially available grades of TPO are that of Basell's C200F, 7353XEP, or T100F. This type of product is typically manufactured in three reactors. In the first reactor, ethylene/propylene copolymer is produced; it is conveyed to a second and third reactor where the ethylene/polypropylene is copolymerized with ethylene. The ethylene, in conjunction with the residual propylene left over from the second reactor, copolymerizes to form an ethylene-propylene rubber. The resultant product has two distinct phases: a continuous semi-rigid ethylene-propylene copolymer matrix and a finely dispersed phase of ethylene-propylene rubber particles. Typically, the two phases have different modulus, wherein a lower modulus material could be a rubbery material. The rubber content of the TPO could be in the range of 30-80 weight percent depending on the desired end-use properties. The term "rubber content" means the amount of the lower modulus material in the TPO. The rubber content can be measured by various techniques such as Fourier Transform Infrared Spectroscopy (FTIR) and Differential Scanning Calorimetry (DSC) among others.

In general, as the rubber concentration increases, the oxygen transmission could ultimately increase, however the haze of the film could increase and the tensile modulus of the film could decrease. Thus, there could be an optimal rubber concentration to achieve the desired balance of film properties. If the ethylene concentration of the copolymer is too low the oxygen transmission could ultimately decrease. As the ethylene concentrations become high, the film haze could increase dramatically. Preferred amounts of TPO to use in the core layer is 10-50% by weight of the core layer, more preferably from 30-50%.

The second component of the blend is an isotactic polypropylene homopolymer or a "minirandom" isotactic polypropylene polymer. Suitable propylene homopolymers commercially available are those such as ExxonMobil PP4772 or AtoFina 3271. A "minirandom" isotactic polypropylene polymer is defined as an isotactic homopolymer polypropylene copolymerized with 0.2-0.8% ethylene. The isotactic index of this polypropylene polymer can be between 90-98%, typically these minirandom copolymers are used to improve tenter film line processability, particularly through the transverse direction orientation process. Preferred amounts of propylene homopolymer to use in the core layer is 10-90% by weight of the core layer, more preferably about 30-50%.

An optional third component of the blend is a homopolymer matrix impact copolymer. Specifically, the matrix resin of the impact copolymer is homopolymer, while ethylene/propylene rubber is copolymerized into the homopolymer network. A suitable impact copolymer commercially available is that of AtoFina 4180. This type of product is typically manufactured in two reactors. In the first reactor, PP homopolymer is produced and it is conveyed to a second reactor that also contains a high concentration of ethylene. The ethylene, in conjunction with the residual propylene left over from the first reactor, copolymerizes to form an ethylene-propylene rubber. The resultant product has two distinct phases: a continuous rigid homopolymer matrix and a finely dispersed phase of ethylene-propylene rubber particles. The rubber content that is typically used is in the 10-30 wt. percent range depending on the desired end-use properties. In general, as the rubber concentration increases, the oxygen transmission could ultimately increase, however the haze of the film could increase and the tensile modulus of the film could decrease. Thus, there could be an optimal rubber concentration to achieve the desired balance of film properties. If the ethylene concentration of the copolymer is too low the oxygen transmission could decrease. As the ethylene concentrations become high, the film haze could increase dramatically. Preferred amounts of impact copolymer to use in the core layer is 0-50% by weight of the core layer, more preferably 10-20%.

In one embodiment, at least one of the skin layers could contain a cyclic olefin copolymer-containing resin (COC). A suitable cyclic olefin copolymer-containing resin is that obtained from Ticona, a division of Celanese AG. In particular, a most suitable grade is Topas® 8007 COC. COC's are made from feedstocks of norbornene and ethylene and are catalytically polymerized to produce a copolymer of norbornene and ethylene. Various properties of the copolymer can be tailored by adjusting norbornene content. The resulting copolymer is crystal clear, amorphous, and has a high modulus. Typical values for a COC material range from 318-465 kpsi with a $T_g$ ranging from 68-180° C., depending on norbornene content. It requires no tie layers to bond well to other polyolefin layers such as polypropylene, polyethylene, and copolymers thereof.

In another embodiment, at least one of the skin layers could contain a styrene-butadiene copolymer-containing resin (SBS) A suitable grade of styrene-butadiene-containing resin is that obtained from BASF Corporation, known as Styrolux® 684D. This SBS is a block copolymer of styrene and butadiene. Styrolux® is particularly preferred as a skin layer in this invention as it intrinsically has very high oxygen transmission rates by itself (2600 cc/100 μm/m²/day-bar) and yet has very good tensile properties and clarity. Styrolux® 684D is optionally blended with crystalline general purpose polystyrene (PS) to improve further mechanical and processing properties. A suitable polystyrene to blend with the SBS copolymer is BASF PS147F. Preferred amounts of PS to blend with the SBS is 0-50%, with the most preferred being 20-40% PS by weight of the skin layer blended with 80-60% SBS by weight of the skin layer.

If the product design comprises a core layer and two skin layers, one on each side of the core layer, the respective skin layers may comprise the same materials (e.g., both skin layer comprising COC or styene-butadiene copolymer) or dissimilar materials, such as one skin layer of COC and the other skin layer of styene-butadiene copolymer. It can also be contemplated to have one skin layer either a COC or styrene-butadiene copolymer-containing resin and the other skin layer a polyolefin. Such a polyolefin can be composed of any of the following materials and combinations thereof thereof: an isotactic polypropylene homopolymer, syndiotactic polypropylene homopolymer, metallocene catalyzed isotactic polypropylene homopolymer, metallocene catalyzed syndiotactic polypropylene homopolymer, ethylene-propylene random copolymer, butene-propylene random copolymer, ethylene-propylene-butene-1 terpolymer, low density polyethylene, linear low density polyethylene, very low density polyethylene, metallocene catalyzed polyethylene, metallocene catalyzed polyethylene copolymers, ethylene-methacrylate copolymers, ethylene-vinyl acetate copolymers, and ionomer resins.

In the case where the polyolefin skin layer is a heat sealable layer, the heat seal layer can be composed of any of the following materials and combinations thereof: an ethylene-propylene random copolymer, ethylene-butene-1 copolymer, ethylene-propylene-butene-1 terpolymer, propylene-butene copolymer, low density polyethylene, linear low density polyethylene, very low density polyethylene, metallocene catalyzed polyethylene plastomer, metallocene catalyzed polyethylene, metallocene catalyzed polyethylene copolymers, ethylene-methacrylate copolymer, ethylene-vinyl acetate copolymer and ionomer resin.

In the case where the polyolefin skin layer is a winding layer, the winding layer can comprise a crystalline polypropylene and an inorganic antiblocking agent. The polyolefin skin layer can also comprise a matte layer of a block copolymer blend of polypropylene and one or more other polymers, the matte layer having a roughened surface. Preferably, the winding layer comprises an antiblock component selected from the group consisting of amorphous silicas, aluminosilicates, sodium calcium aluminum silicate, a crosslinked silicone polymer, and polymethylmethacrylate.

The polyolefin skin layers can be surface treated with corona treatment, flame treatment, atmospheric plasma, or a special corona treatment utilizing a mixed gas environment of nitrogen and carbon dioxide. Most particularly preferred is a surface treatment consisting of a special corona treatment utilizing a mixed gas environment of nitrogen and carbon dioxide only, to the exclusion of oxygen. This results in particularly preferred generation of nitrogen-containing functional groups on the polyolefin surface from about 0.3% to 1.0% of the surface. This multilayer film can then be directly printed, vapor-deposition metallized, coated, adhesive laminated, or extrusion laminated. Most particularly preferred is printing of the skin layers.

It is also contemplated to add optional amounts of slip and antiblock additives into these skin layers, up to 5000 ppm for slip and antiblock properties. Suitable types of antiblocks include, but are not limited to: amorphous silicas, silicates, sodium calcium aluminosilicates, crosslinked silicone polymer such as polymethylsilsesquioxanes, polymethylmethacrylate beads, etc. Typical useful particle sizes of these antiblocks range from 1-12 micron, preferably in the range of 2-6 micron. Suitable types of slip agents include but are not limited to fatty amides such as stearamide, erucamide, behenamide, etc., or silicone oils, or glycerol monostearates, etc.

The core resin layer is typically 5 micron to 50 micron in thickness after biaxial orientation, preferably between 10 micron and 25 micron, and more preferably between 12.0 micron and 17.5 micron in thickness. Additionally, a small amount of inorganic antiblocking agent may be optionally added up to 1000 ppm to this resin layer if the film design is a 2-layer film. Preferably 300-500 ppm of antiblock may be added. Suitable antiblock agents comprise those such as inorganic silicas, sodium calcium aluminosilicates, crosslinked silicone polymers such as polymethylsilsesquioxane, and polymethylmethacrylate spheres. Typical useful particle sizes of these antiblocks range from 1-12 micron, preferably in the range of 2-6 micron. The skin resin layer thickness could be 0.5 micron to 5 micron after biaxial orientation; preferably the skin layer thickness could be from 1 to 3 micron in thickness.

The coextrusion process includes a three-layered compositing die. The polymer core layer is sandwiched between the skin resin layers. The three layer laminate sheet is cast onto a cooling drum whose surface temperature is controlled between 20° C. and 60° C. to solidify the non-oriented laminate sheet. The non-oriented laminate sheet is stretched in the longitudinal direction at about 135 to 165° C. at a stretching ratio of about 4 to about 5 times the original length and the resulting stretched sheet is cooled to about 15° C. to 50° C. to obtain a uniaxially oriented laminate sheet. The uniaxially oriented laminate sheet is introduced into a tenter and preliminarily heated between 130° C. and 180° C., and stretched in the transverse direction at a stretching ratio of about 7 to about 12 times the original length and then heat set to minimize shrinkage and give a biaxially oriented sheet. The biaxially oriented film has a total thickness between 6 and 40 micron, preferably between 10 and 25 micron, and most preferably between 12 and 18 micron (48 G and 72 G).

EXAMPLE 1

A three layer 66 gauge biaxially oriented film was manufactured on a 1.5-meter wide BOPP tenter line. The outer skin layers were 12 gauge units each. Both skin layers used a blend of 70% Styrolux 684D and 30% PS 147F polystyrene by weight of the skin layer. The core layer was a two component blend of 50% by weight of the core layer of an isotactic polypropylene ExxonMobil PP4772 having a melt flow of 1.6 g/10 min and 50% by weight of the core layer of a ethylene/propylene TPO Basell 7353XEP having a melt flow of 6.0 g/10 min. The ethylene/propylene TPO has a rubber content of approximately 30-40%, while the ethylene content of the rubber is approximately 15-20%.

The sheet was heated to 135° C., stretched 5 times in the machine direction, cooled, introduced into a tenter oven, heated to 164° C., stretched to 9 times in the transverse direction and cooled.

EXAMPLE 2

A film similar to Example 1 was produced except that the core layer was a three component blend of 15% by weight of the core layer of an isotactic polypropylene impact copolymer AtoFina 4180 having a melt flow of 1.3 g/10 min, 45% of a ethylene/propylene TPO Basell C200F having a melt flow of 6.0 g/10 min, and 40% of an isotactic polypropylene homopolymer ExxonMobil PP4772 having a melt flow index of 1.6 g/10 min. The isotactic polypropylene impact copolymer has a rubber content of approximately 10-20%, while the ethylene content of the rubber is approximately 50%. The ethylene/propylene TPO has a rubber content of approximately 30-40%, while the ethylene content of the rubber is approximately 15-20%.

EXAMPLE 3

A three layer 70 gauge biaxially oriented film was manufactured on a 1.5-meter wide BOPP tenter line. The outer skin layers were 7 gauge units each. Both skin layers comprised Topas 8007 COC 100% by weight of the skin layer. The core layer was a three component blend of 15% by weight of the core layer of an isotactic polypropylene impact copolymer AtoFina 4180 having a melt flow of 1.3 g/10 min, 45% of a ethylene/propylene TPO Basell C200F having a melt flow of 6.0 g/10 min, and 40% of an isotactic polypropylene homopolymer ExxonMobil PP4772 having a melt flow index of 1.6 g/10 min. The isotactic polypropylene impact copolymer has a rubber content of approximately 10-20%, while the ethylene content of the rubber is approximately 50%. The ethylene/propylene TPO has a rubber content of approximately 30-40%, while the ethylene content of the rubber is approximately 15-20%.

The sheet was heated to 135° C., stretched 5 times in the machine direction, cooled, introduced into a tenter oven, heated to 164° C., stretched to 9 times in the transverse direction and cooled.

EXAMPLE 4

A three layer 68 gauge biaxially oriented film similar to Example 1 was made except that the skin layers comprised an isotactic propylene homopolymer AtoFina EOD02-19 at a melt flow of 4.5 g/10 min of 3 gauge units each.

EXAMPLE 5

A three layer 70 gauge biaxially oriented film similar to Example 2 was made except that the skin layers comprised an isotactic propylene homopolymer AtoFina EOD02-19 at a melt flow of 4.5 g/10 min of 3 gauge units each.

COMPARATIVE EXAMPLE 1

A three layer 63 gauge biaxially oriented polypropylene (BOPP) film was manufactured on a 1.5-meter wide BOPP tenter line. The outer skin layers were 3 gauge units each. Both skin layers used an isotactic propylene homopolymer AtoFina EOD02-19 at a melt flow rate of 4.5 g/10 min as measured by ASTM D1238. Isotactic polypropylene resin ExxonMobil PP4772 was used in the core layer. The melt flow rate of the core isotactic propylene homopolymer was 1.6 g/10 min.

The sheet was heated to 135° C., stretched 5 times in the machine direction, cooled, introduced into a tenter oven, heated to 164° C., stretched to 9 times in the transverse direction and cooled.

COMPARATIVE EXAMPLE 2

A three layer 63 gauge biaxially oriented polypropylene (BOPP) film similar to Comparative Example 1 was manufactured on a 1.5-meter wide BOPP tenter line except that the core layer was a two component blend of 33% by weight of the core layer of an isotactic polypropylene impact copolymer AtoFina 4180 having a melt flow of 1.3 g/10 min and 67% of an isotactic propylene homopolymer ExxonMobil PP4772 having a melt flow index of 1.6 g/10 min. The isotactic polypropylene impact copolymer has a rubber content of approximately 10-20%, while the ethylene content of the rubber is approximately 50%.

COMPARATIVE EXAMPLE 3

A three layer 63 gauge biaxially oriented polypropylene (BOPP) film similar to Comparative Example 2 was manufactured on a 1.5-meter wide BOPP tenter line except that the core layer blend ratio was changed to 66% by weight of the core layer of an isotactic polypropylene impact copolymer AtoFina 4180 and 34% of an isotactic propylene homopolymer ExxonMobil PP4772.

COMPARATIVE EXAMPLE 4

A three layer 70 gauge biaxially oriented polypropylene (BOPP) film similar to Comparative Example 2 was manufactured on a 1.5-meter wide BOPP tenter line except that the isotactic polypropylene impact copolymer AtoFina 4180 was replaced by Basell C200F thermoplastic polyolefin, an ethylene/propylene-containing TPO having a melt flow of 6 g/10 min. The ethylene/propylene TPO has a rubber content of approximately 30-40%, while the ethylene content of the rubber is approximately 15-20%.

The following tables 1 and 2 illustrate the results of the foregoing Examples ("Ex") and Comparative Examples ("CEx").

TABLE 1

| Film Properties | Ex 1 | Ex 2 | Ex 3 | Ex 4 | Ex 5 |
| --- | --- | --- | --- | --- | --- |
| Film Thickness (Gauge) | 66 | 66 | 70 | 68 | 70 |
| O2TR (cc/100 in$^2$/day) | 671.7 | 705.6 | 660.9 | 563.5 | 616.1 |
| O2TR normalized to 60 G | 738.9 | 776.2 | 771.1 | 638.6 | 718.8 |
| A Side Gloss (45°) | 115 | 115 | 147 | 91.1 | 105.5 |
| B Side Gloss (45°) | 113 | 113 | 148 | 90.8 | 104.5 |
| Haze (%) | 4.2 | 4.2 | 3.2 | 5.81 | 5.58 |
| MD Tensile Modulus (psi) | 174,182 | 172,222 | 274,000 | 151,000 | 156,559 |

TABLE 2

| Film Properties | CEx 1 | CEx 2 | CEx 3 | CEx 4 |
| --- | --- | --- | --- | --- |
| Film Thickness (Gauge) | 63 | 63 | 65 | 65 |
| O2TR (cc/100 in$^2$/day) | 125.2 | 202.9 | 312.1 | 263.5 |

TABLE 2-continued

| Film Properties | CEx 1 | CEx 2 | CEx 3 | CEx 4 |
|---|---|---|---|---|
| O2TR normalized to 60G | 131.8 | 213.0 | 338.1 | 285.5 |
| A Side Gloss (45°) | 114.4 | 92.4 | 73.1 | 124.3 |
| B Side Gloss (45°) | 122.7 | 93.5 | 84.8 | 127.4 |
| Haze (%) | 0.77 | 4.83 | 26.1 | 3.59 |
| MD Tensile Modulus (psi) | 374,873 | 343,708 | 233,856 | 238,823 |

As the tables above indicate, adding to the core layer increasing amounts of impact copolymer or thermoplastic olefin copolymer improves the oxygen transmission rate over a film without such materials in the core. In particular, when the amount of TPO in the core is substantial, the oxygen transmission rate is significantly much higher. However, as is also shown in the tables, MD modulus and optical properties are worsened by the addition of such impact copolymers and TPO's to the core layer.

The addition of outer skins of SBS-containing resins or COC-containing resins significantly improves the MD modulus and optical properties when used with the blended core layer of impact copolymer, TPO, and propylene homopolymer as shown in the tables. Moreover, these mechanical and optical properties are improved along with a significant increase in oxygen gas transmission rates. In particular, when these SBS and/or COC skins are compared to propylene homopolymer skins with the same core blends of impact copolymer, TPO, and propylene homopolymer, not only are the significantly high oxygen transmission rates maintained, but also the mechanical properties (as illustrated by MD modulus) and optical properties (as illustrated by gloss and haze) are significantly improved.

Test Methods

The various properties in the above examples were measured by the following methods:

A) Oxygen transmission rate of the film (O2TR) was measured by using a Mocon Oxtran 2/20 unit substantially in accordance with ASTM D3985. In general, the preferred value was an average value equal to or greater than 400 cc/100 in$^2$/day. O2TR is normalized to 60 G by taking a ratio of the respective test film's thickness gauge and 60 G and multiplying by the respective test film's O2TR value. E.g. a film of 70 G has 500 cc/100 in2/day O2TR. To calculate the O2TR of its 60 G film equivalent:

(70 G/60 G)×500 cc/100 in2/day=583.3 cc/100 in2/day.

B) Moisture transmission rate of the film was measured by using a Mocon Permatran 3/31 unit measured substantially in accordance with ASTM F1249.

C) Surface chemistry of the discharge-treated surface was measured using ESCA surface analysis techniques. A Physical Electronics model 5700LSci X-ray photoelectron/ESCA spectrometer was used to quantify the elements present on the sample surface. Analytical conditions used a monochromatic aluminum x-ray source with a source power of 350 watts, an exit angle of 50°, analysis region of 2.0 mm×0.8 mm, a charge correction of C—(C,H) in C 1s spectra at 284.6 eV, and charge neutralization with electron flood gun. Quantitative elements such as O, C, N were reported in atom %.

D) Wetting tension of the surfaces of interest was measured substantially in accordance with ASTM D2578-67. In general, the preferred value was an average value equal to or more than 40 dyne/cm with a minimum of 38 dyne/cm.

E) Tensile properties were measured in an Instron Tensile tester. The biaxially oriented films were tested in both the machine direction and transverse directions. Young's Modulus, Elongation (% strain at ultimate), and Tensile Strength (stress at ultimate) was tested substantially in accordance with ASTM D822. Desired machine direction (MD) modulus values were 160,000 psi or more.

F) Gloss was measured on both sides of the film ("A" and "B" sides with "A" side arbitrarily assigned to the cooling drum side of the cast film and "B" side arbitrarily assigned to the air side of the cast film) using a commercially available gloss meter such as available from Gardner Instruments "Mirror-Tri-Gloss" or Suga Test Instruments UGV-5D and measured substantially in accordance with ASTM D2457. Desired gloss values were 100 or higher.

G) Haze was measured using commercially available haze metters such as Gardner Instruments "Haze-Gard Plus" and measured substantially in accordance to ASTM D1003: Desired haze values were 5% or less for a single sheet.

The invention claimed is:

1. A biaxially oriented multilayer film, comprising:
(a) a polyolefinic core layer comprising (i) a thermoplastic material comprising an alpha olefin/polypropylene-containing copolymer, the thermoplastic material being in an amount of about 10% to 70% by weight of the core layer, and (ii) an isotactic polypropylene-containing copolymer in an amount of greater than 0% to about 50% by weight of the core layer; and
(b) a skin layer comprising a cyclic olefin copolymer,
wherein the alpha olefin/polypropylene-containing copolymer comprises a rubber having a rubber content between 30% to 80% by weight of the alpha olefin/polypropylene-containing copolymer and an ethylene content of 15% to 20% by weight of the rubber, and
wherein the film has a haze of less than 4.5%.

2. The film of claim 1, wherein the polyolefinic core layer further comprises a homopolymer matrix copolymer having two distinct phases: a continuous homopolymer matrix phase and a dispersed phase of ethylene-propylene rubber particles.

3. The film of claim 1, wherein the isotactic polypropylene-containing copolymer has an isotactic index in the range of 90-98% and a melt flow index in the range of between 1 to 10 g/10 min.

4. The film of claim 1, wherein the alpha olefin/polypropylene-containing copolymer has a melt flow index in the range of between 1 to 10 g/10 min, the alpha olefin of the alpha olefin/polypropylene-containing copolymer is ethylene, and the ethylene content of the alpha olefin/polypropylene-containing copolymer is between 1-10% by weight of the alpha olefin/polypropylene-containing copolymer.

5. The film of claim 1, wherein the isotactic polypropylene-containing copolymer is a minirandom isotactic polypropylene polymer.

6. The film of claim 1, wherein cyclic olefin copolymer is transparent, amorphous, has a tensile modulus from 318-465 kspi and a glass transition temperature ($T_g$) ranging from 68-180° C.

7. A biaxially oriented multilayer film, comprising:
(a) a polyolefinic core layer comprising (i) a thermoplastic material comprising an alpha olefin/polypropylene-containing copolymer, the thermoplastic material being in an amount of about 10% to 70% by weight of the core layer, and (ii) an isotactic polypropylene-containing copolymer in an amount of greater than 0% to about 50% by weight of the core layer comprising a rubber-containing phase comprising a rubber content between 5-30% by weight of the copolymer and an ethylene content of 10% to 80% by weight of the rubber-containing phase; and (b) a skin layer comprising a styrene-butadiene copolymer, wherein the alpha olefin/polypropylene-containing copolymer comprises a rubber having a rubber content between 30% to 80% by weight of the alpha olefin/polypropylene-containing copolymer and an ethylene content of 15% to 20% by weight of the rubber, and wherein the film has a haze of less than 4.5%.

8. The film of claim 7, wherein the polyolefinic core layer further comprises a homopolymer matrix copolymer having two distinct phases: a continuous homopolymer matrix phase and a dispersed phase of ethylene-propylene rubber particles.

9. The film of claim 8, wherein the skin layer further comprises polystyrene.

10. The film of claim 7, wherein the isotactic polypropylene-containing copolymer has an isotactic index in the range of 90-98% and a melt flow index in the range of between 1 to 10g10min.

11. The film of claim 7, wherein the alpha olefin/polypropylene-containing copolymer has a melt flow index in the range of between 1 to 10 g/10 min, the alpha olefin of the alpha olefin/polypropylene-containing copolymer is ethylene, and the ethylene content of the alpha olefin/polypropylene-containing copolymer is between 1-10% by weight of the alpha olefin/polypropylene-containing copolymer.

12. The film of claim 7, wherein the isotactic polypropylene-containing copolymer is a minirandom isotactic polypropylene polymer.

13. A biaxially oriented multilayer film, comprising:
(a) a polyolefinic core layer consisting essentially of (i) a thermoplastic material comprising an alpha olefin/polypropylene-containing copolymer, the thermoplastic material being in an amount of about 10% to 70% by weight of the core layer, (ii) an isotactic polypropylene-containing copolymer in an amount of greater than 0% to about 50% by weight of the core layer comprising a rubber-containing phase comprising a rubber content between 5-30% by weight of the copolymer and an ethylene content of 10% to 80% by weight of the rubber-containing phase, and optionally iii) a homopolymer matrix copolymer having two distinct phases: a continuous homopolymer matrix phase and a dispersed phase of ethylene-propylene rubber particles; and (b) a skin layer comprising a styrene-butadiene copolymer, wherein the alpha olefinpolypropylene-containing copolymer comprises a rubber having a rubber content between 30% to 80% by weight of the alpha olefin/polypropylene-containing copolymer and an ethylene content of 15% to 20% by weight of the rubber, and wherein the film has a haze of less than 4.5%.

14. A biaxially oriented multilayer film, comprising:
(a) a polyolefinic core layer; and
(b) a skin layer comprising a copolymer,
wherein the biaxially oriented multilayer film has the following properties: (i) an oxygen transmission normalized to 60 gauge of at least 500 cc/100 in$^2$/day, (ii) a 45 degree angle gloss of at least 100, (iii) haze of less than 4.5%, and (iv) a tensile modulus of greater than 160,000 psi, and wherein the polyolefinic core layer comprises a thermoplastic material comprising an ethylene propylene rubber copolymerized into an ethylene/propylene copolymer network, wherein the ethylene content of the ethylene propylene rubber is 15% to 20%.

15. The film of claim 14, wherein the oxygen transmission normalized to 60 gauge is at least 650 cc/100 in$^2$/day.

16. The film of claim 14, wherein a 45 degree angle gloss is at least 110.

17. The film of claim 14, wherein the tensile modulus is at least 170,000 psi.

18. The film of claim 14, wherein the polyolefinic core layer further comprises a minirandom isotactic polypropylene polymer.

19. The film of claim 18, wherein the skin layer is surface treated and has nitrogen-containing function groups on 0.3% to 1.0% of a surface of the skin layer.

* * * * *